United States Patent
McGrath et al.

(10) Patent No.: US 6,771,285 B1
(45) Date of Patent: Aug. 3, 2004

(54) EDITING DEVICE AND METHOD

(75) Inventors: Mark John McGrath, Bracknell (GB); Andrew Kydd, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 411 days.

(21) Appl. No.: 09/722,122

(22) Filed: Nov. 24, 2000

(30) Foreign Application Priority Data

Nov. 26, 1999  (GB) .............................................. 9928028

(51) Int. Cl.[7] .............................................. G06F 13/00
(52) U.S. Cl. ..................................... 345/723; 345/767
(58) Field of Search .............................. 345/767, 716, 345/723, 724, 725, 726; 715/500.1; 386/52–55

(56) References Cited

U.S. PATENT DOCUMENTS

| | | | | |
|---|---|---|---|---|
| 5,388,197 A | * | 2/1995 | Rayner | 345/723 |
| 5,467,288 A | * | 11/1995 | Fasciano et al. | 345/716 |
| 5,519,828 A | * | 5/1996 | Rayner | 345/723 |
| 5,732,184 A | * | 3/1998 | Chao et al. | 386/55 |
| 5,758,180 A | * | 5/1998 | Duffy et al. | 710/122 |
| 5,760,767 A | * | 6/1998 | Shore et al. | 345/723 |
| 5,781,188 A | * | 7/1998 | Amiot et al. | 345/723 |
| 5,889,514 A | * | 3/1999 | Boezeman et al. | 715/500.1 |
| 5,999,173 A | * | 12/1999 | Ubillos | 345/724 |
| 6,188,396 B1 | * | 2/2001 | Boezeman et al. | 715/500.1 |

FOREIGN PATENT DOCUMENTS

| | | |
|---|---|---|
| EP | 0 843 311 | 5/1998 |
| GB | 2 312 138 | 10/1997 |
| GB | 2 312 139 | 10/1997 |
| WO | WO 98/25216 | 6/1998 |
| WO | WO 99/54879 | 10/1999 |

* cited by examiner

Primary Examiner—Cao (Kevin) Nguyen
(74) Attorney, Agent, or Firm—Frommer Lawrence & Haug LLP; William S. Frommer

(57) ABSTRACT

Editing apparatus for controlling editing of source audio and/or video material stored as one or more source files on a storage medium to generate an edited material series of clips from the source material arranged as one or more parallel sequences of temporally successive source material clips, at least some of the clips having one or more predefined time points within the clip comprises user-controllable means for adjusting the temporal position of a start point, an end point or both of clips in the edited material series, the adjusting means being operable to adjust the temporal position in steps so that at each step the temporal position is aligned with a predefined point of another clip in the same or another parallel sequence.

11 Claims, 6 Drawing Sheets

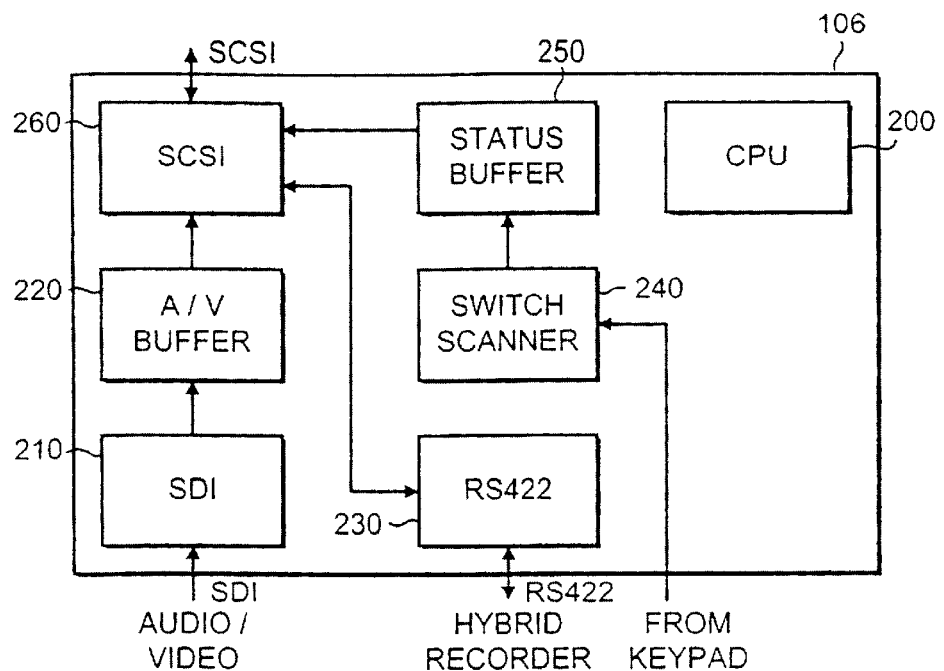
FIG. 2
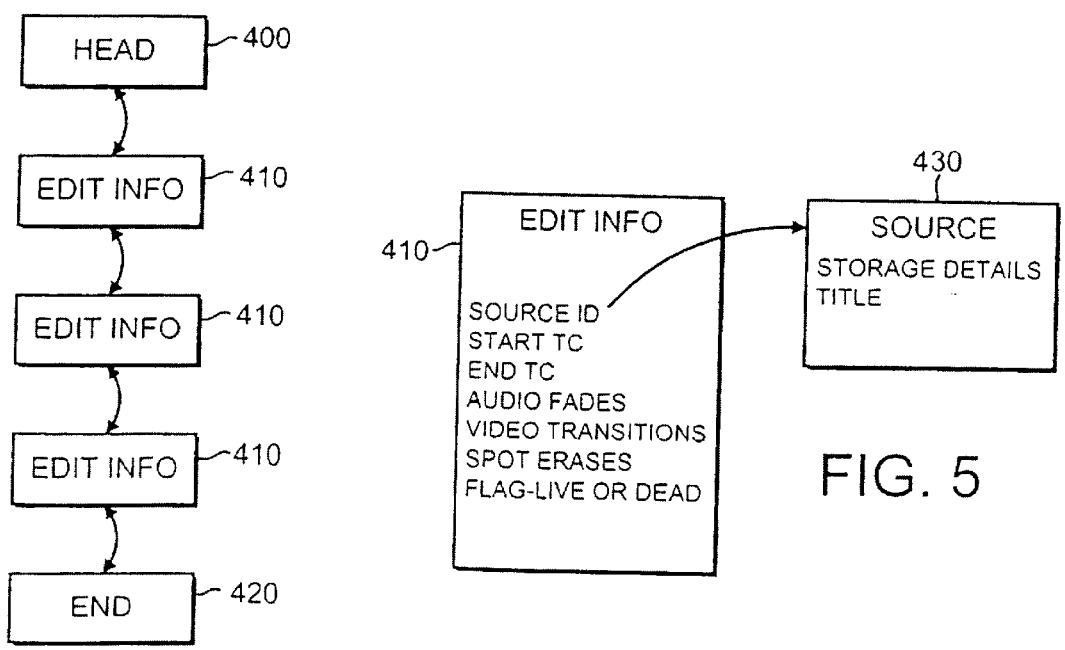
FIG. 4
FIG. 5

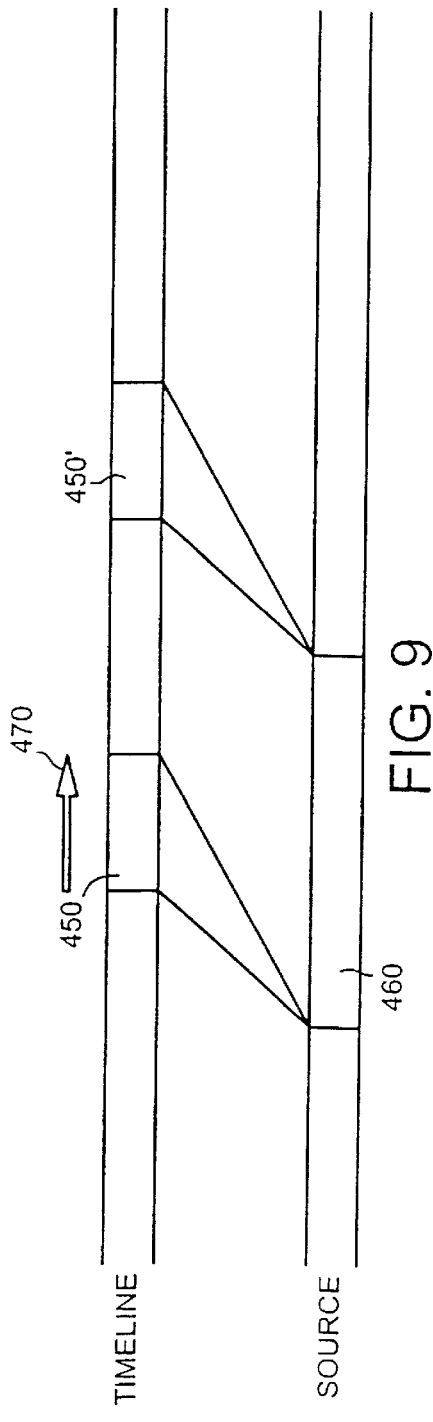

EDITING DEVICE AND METHOD

BACKGROUND OF THE INVENTION

1. Field of the Invention

This invention relates to the editing of recorded material such as audio and/or video material.

2. Description of the Prior Art

Audio/video edit controllers are used to edit a number of "raw" source material sequences into a final program or part of a program. For example, a short news story may contain brief excerpts of a number of different video sequences, possibly including newly captured and older, archived sequences, in order to illustrate different aspects of the news story. A relevant portion or "clip" of each sequence needs to be selected, and the selected portions linked together to form the composite output sequence.

Recently, computer-based non-linear edit controllers have become available. These allow a user to view the source sequences on a computer screen and to select an "in-point" and an "out-point" for each required sequence or clip using the computer keyboard or a cursor control device such as a mouse, joystick or trackerball. The selected clips can then be ordered to form the desired output sequence. An example of such a non-linear editing system is the DNE 700 system available from Sony Corporation (Sony is a registered trademark).

Traditional linear editors are destructive in their adjustment of prior edits, overwriting previous edit decisions with new ones. In contrast, non-linear editors are non-destructive, allowing events that have been edited to the current story or output sequence to be adjusted or trimmed. Various trimming functions are available to non -linear editing, allowing edit points or selected events to be adjusted relative to their surrounding events.

It is a constant aim in the field of material editing to improve the convenience of use of the editing equipment.

SUMMARY OF THE INVENTION

This invention provides editing apparatus for controlling editing of source audio and/or video material stored as one or more source files on a storage medium to generate an edited material series of clips from the source material arranged as one or more parallel sequences of temporally successive source material clips, at least some of the clips having one or more predefined time points within the clip, the apparatus comprising:

user-controllable means for adjusting the temporal position of a start point, an end point or both of clips in the edited material series, the adjusting means being operable to adjust automatically the temporal position in steps so that at each step the temporal position is aligned with a predefined point of another clip in the same or another parallel sequence.

The invention recognises and addresses a difficulty which can occur when moving clips within an edited series. This difficulty is that on, for example, a display screen of finite resolution it can be difficult for the user to tell when the clip currently being adjusted is aligned with other temporal events such as the beginning or end of other clips, general time points, points predefined as points of interest by the user and so on.

The elegant solution provided by the invention is to allow such temporal positions to be adjusted step-wise, each step resulting in the position under adjustment being temporally aligned with a predefined point in one of the clips.

Further respective aspects of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 is a schematic diagram of a digital signal processing card;

FIG. 4 schematically illustrates a linked list of edit information data items;

FIG. 5 schematically illustrates an edit information data item;

FIG. 9 schematically illustrates a slip recorder operation;

FIG. 10 schematically illustrates an indication on the timeline of a loss of synchronisation between tracks;

DESCRIPTION OF THE PREFERRED EMBODIMENTS

Figure 1:
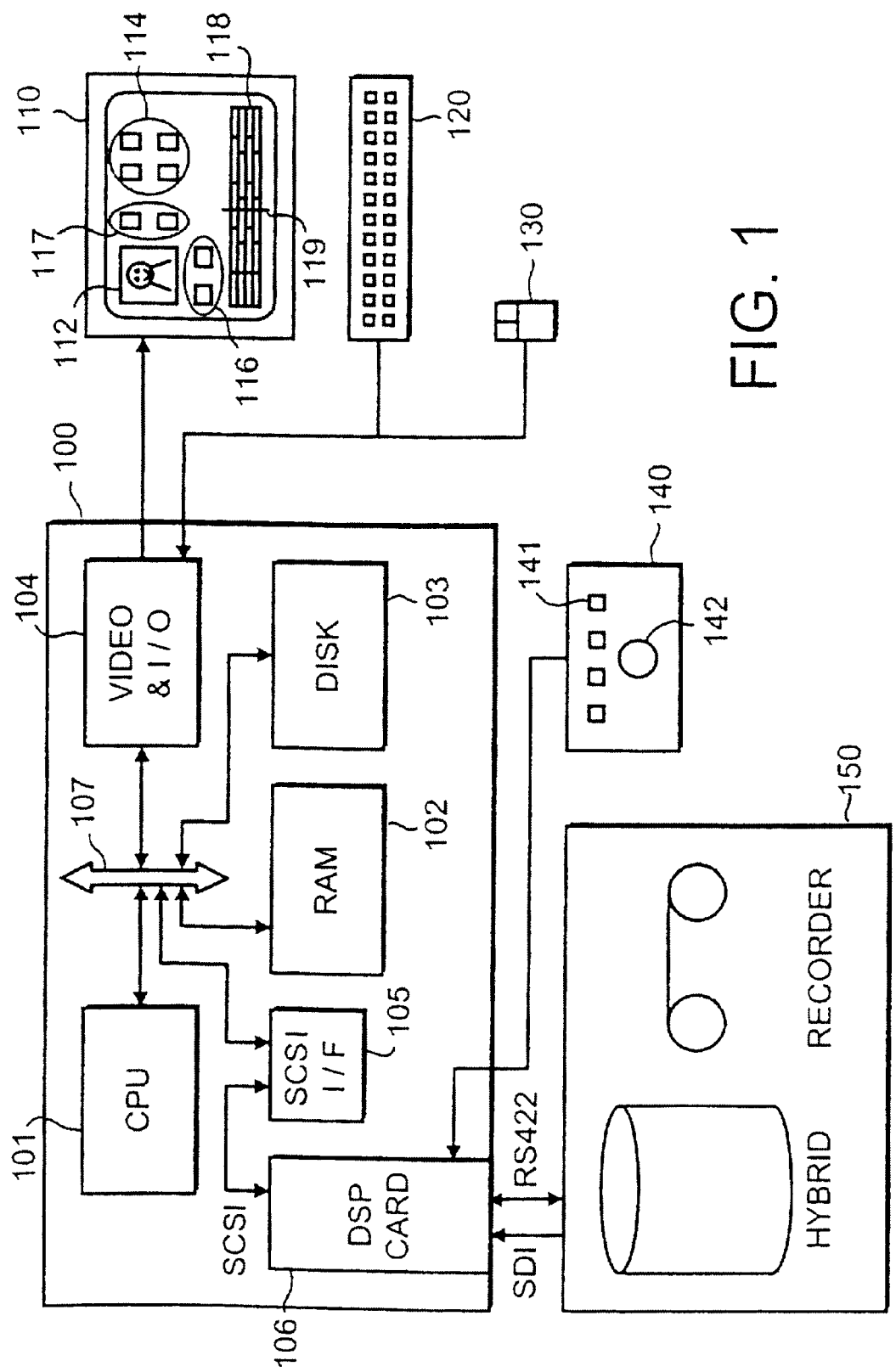
FIG. 1 is a schematic diagram of an audio/video editing system.

FIG. 1 is a schematic diagram of an audio/video editing system. The editing system comprises a general purpose personal computer (PC) 100 having a video display unit (VDU) 110, a keyboard 120 and a cursor control device such as a mouse 130, an editing control panel 140 and an audio/video storage device 150.

In the embodiment described here, the storage device 150 is a so-called "hybrid recorder" manufactured by Sony Corporation and generally available at the priority date of the present application under any of the following part numbers: DNW A100-P, DNW A50-P, DNW A45-P, DNW A100, DNW A50, DNW A45. The hybrid recorder comprises a tape storage system based on a removable cassette and a hard disk storage system providing either 45 or 90 minutes of storage time for audio/video material. Some models also provide rapid streaming between tape and disk, at a higher than real-time rate. The hybrid recorder is a particularly convenient device to use in an editing system: the controlling device (in this case, the PC 100) provides the hybrid recorder with a "virtual file" indicating, in a particular file protocol, the material to be played back in a certain operation. The hybrid recorder then makes the required material available for playback from disk. It is possible for the hybrid recorder to play back at least partly from tape instead (albeit using a communication protocol different to the virtual file protocol) although it will be appreciated that playback from disk tends to be more convenient for the present type of work.

The PC 100 comprises a central processing unit (CPU) 101, a random access memory (RAM) 102, disk storage 103, video and input/output (I/O) interfaces 104, a SCSI interface 105 and a digital signal processing (DSP) interface card 106. The CPU 101, RAM 102, disk 103, video and I/O 104 and SCSI interface 105 are all interconnected via a common bus 107. The system operates under the control of program codes stored in the RAM 102 and/or the disk storage 103.

The PC 100 communicates with the hybrid recorder by two means: the hybrid recorder 150 transmits audio/video material to the PC by a so-called "SDI" transmission link. SDI stands for "Serial Digital Interface" and is an established audio/video transmission format, so particular details of this transmission format will not be given here. Control commands are passed to the hybrid recorder and status information such as a current time code is passed from the hybrid recorder to the PC via a so-called RS422 interface. Again, this is an established interface format and so will not be described in detail here. The DSP card also receives information from the editing panel 140 which comprises a number of push-button controls such as "play", "shuttle forward" and so on, and a jog/shuttle wheel 142. Details of this communication of data will be described below with reference to FIG. 2.

Data is passed to and from the DSP card 106 via a SCSI link using the SCSI interface 105. The data passed to and from the rest of the PC by this route includes control commands, timecode and status information and audio/video information.

The editing system is intended to operate in a non-linear fashion. Audio/video material stored on the hybrid recorder 150 can be arranged into "clips" which are then ordered one after another in time to form a continuous piece of output material. The system provides various graphical user interface (GUI) features to assist the user in carrying out this function. In particular, the system provides a "viewer window" 112 in which the current edited output material or any individual clip can be viewed, a "browser" formed of a set of source material icons 114 each representing an individual source material file which has been set up with an in point and an out point by the user, icons 116 defining a current source file on the hybrid recorder, icons 117 defining an in point and out point of the currently viewed clip, a so-called timeline 118 showing the arrangement of clips forming the output edited sequence in a time order running from left to right of the screen, and a "now-line" 119 showing a current display position on the timeline 118. The timeline 118 and the now-line 119 will be described in much greater detail below.

FIG. 2 is a schematic diagram of the DSP card 106. The DSP card 106 comprises a CPU 200 (separate to the CPU 101 of the PC 100) which controls the operation of the DSP card 106, an SDI receiver 210, an audio/video (A/V) buffer 220, an RS422 transceiver 230, a switch scanner 240, a status buffer 250 and a SCSI interface 260.

The SDI receiver 210 receives audio/video information from the hybrid recorder 150. It is noted that there is no need for audio/video information to be returned to the hybrid recorder 150 from the PC 100—all that the PC 100 returns to the recorder is edit control information defining (amongst other things) the order in which material is to be re-played from the hybrid recorder 150. So, the SDI link is unidirectional.

The A/V material received by the SDI receiver 210 is buffered in the A/V buffer 220. This holds one frame's worth of material, so that when a next frame's material is received it replaces the previously held data. The system used to display the material, for example in the viewer window 112, is that the CPU 101 of the PC 100 carries out a loop operation including a request sent via the SCSI interface to the DSP card 106 for a next frame of data. When such a request is received by the SCSI interface 260 on the DSP card 106, the current frame of data stored in the A/V buffer 220 is retrieved and transmitted to the CPU 101 and/or video card 104 for display. This loop operation arrangement means that if the CPU 101 has many other tasks to perform at the same time as displaying video in the viewer window 112, the fact that the CPU 101 has to request each frame for display means that frames are automatically delivered at an appropriate rate which the CPU 101 can handle. It may be that the display in the viewer window 112 occasionally skips frames if the CPU and other system resources are heavily loaded at that time, but overall the arrangement ensures that the display keeps up with real time rather than building up a backlog of undisplayed frames. In any event, in prototype embodiments based around a Compaq Deskpro PC using an Intel Pentium II CPU running at 450 MHz, the situation in which frames are skipped is seen to occur rarely in normal use. (Compaq, Intel and Pentium are registered trademarks).

As mentioned above, the PC 100 transmits control commands to the hybrid recorder 150 via an RS422 link. In particular, any commands to be sent to the hybrid recorder are issued from the CPU 100 via the SCSI interface 105 to the SCSI interface 260 on the DSP card 106. From there they are routed to the RS422 interface 230 and sent onto the hybrid recorder. Examples of the commands transmitted in this way are simple demands such as "play", "stop" or more complex commands such as a command setting up a "virtual file" for replay (reference is made to the literature accompanying currently available hybrid recorder products to define the generation of a virtual file).

Data is also received back from the hybrid recorder via the RS422 interface 230, the SCSI interface 260, the SCSI interface 105 to the CPU 101. Examples of this type of data are details of the A/V files stored on the hybrid recorder 150 and the current time code during a replay operation.

The operation of the switch scanner 240 and status buffer 250 will now be described. As mentioned above, the edit control panel 140 includes a number of push-button controls 141 and a jog/shuttle control wheel 142. These controls mimic those often found on audio/video equipment.

The switch scanner 240 establishes the status of each of these controls at a frequency of at least once per frame period. For the push buttons, which are hard-wired directly to the switch scanner, this assessment of status is very simple in that the switch scanner 240 simply assess whether the push button is open or closed (i.e. not pressed or pressed) at the sampling instant and stores this result in the status buffer 250. In a prototype embodiment there are eight push buttons and so the status of these controls can be stored in a single eight-bit byte in the status buffer 250.

For the jog/shuttle wheel 142, a little more information is required in that the jog/shuttle wheel 142 may move in either direction and by various amounts between sampling instants. The jog/shuttle wheel 142 has a position encoder of conventional type provided in the control panel 140, giving a numerical output indicative of a current position of the wheel 142. The switch scanner 240 samples the current position of the wheel and encodes the difference between the current position and the previously sampled position in an eight-bit byte. Here, the most significant bit is used to flag whether the change in position is positive or negative, the next most significant bit to flag whether the wheel 142 is in a jog or shuttle mode, and the remaining six bits provide a change value of between 0 and 63.

At each frame period, the CPU 101 requests status information from the DSP card 106 where that status information includes the current replay time code and the control panel status from the status buffer 250.

Figure 3:
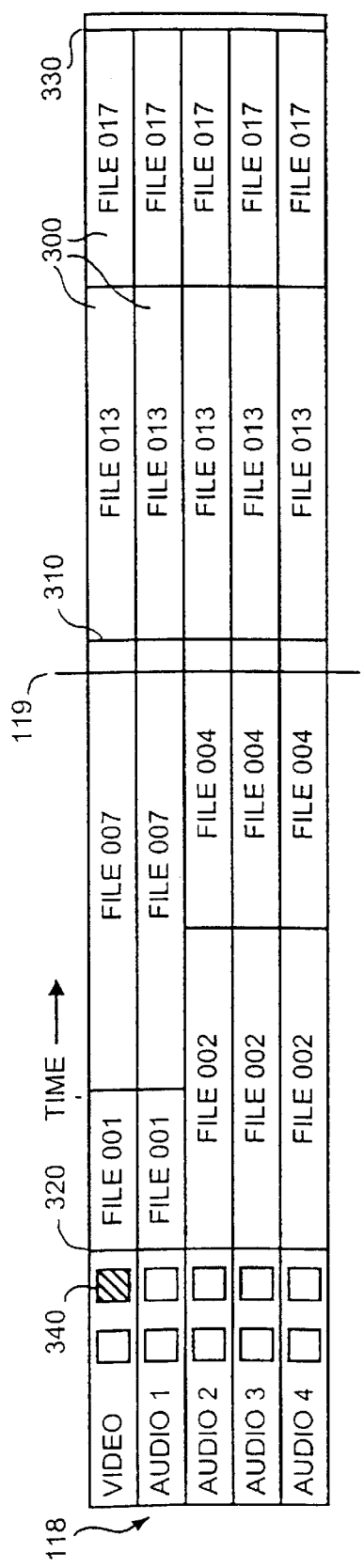
FIG. 3 is a schematic diagram of a timeline.

FIG. 3 is a schematic diagram of a timeline 118.

As mentioned above, the timeline provides a graphical representation of a succession of video or audio clips 300 along a horizontal time access. The boundaries between clips are indicated by a vertical line (e.g. the line 310) in the case of a simple cut transition between successive clips or by more complicated graphical icons such as triangles to represent wipe or fade transitions between successive clips. The length of each clip representation 300 is proportional to the length (in time) of the corresponding clip, that is to say the difference between the clip's out-point time code and its in-point time code. Within a clip, the distance along the clip representation 300 is used to indicate the temporal position within that clip.

The timeline is arranged so as to give a scaleable graphical indication of the sequence of clips. That is to say, although on the screen the display distance between the start of the timeline 320 and the end of the timeline 330 remains the same, the time scale used for the display in between can be varied. This also means that there may well be further clips not displayed to the left and/or to the right of the currently displayed portion of the sequence of clips.

Within each clip representation is a textual indication of the source of that material, for example the name of a file stored on the hybrid recorder 150.

The timeline is arranged as several rows or tracks, labeled in this example as "video", "audio 1", "audio 2", "audio 3" and "audio 4". Each of these represents a respective recording track which can form a constituent part of the output edited signal.

The "now-line" 119 is used during a replay operation to indicate a current time. That is to say, during replay the frames or audio data at temporal positions within their respective clips defined by the now-line will be displayed or replayed. In general, the now-line remains substantially at the centre of the display screen and the timeline scrolls beneath it. In a normal (forward) replay direction, this means that the timeline scrolls from right to left underneath the substantially stationary now-line. It can be seen that the material replayed on the different tracks at a particular instant does not have to come all from the same source file. In accordance with normal editing practice, material can be simultaneously replayed from different source files. So, for example, at the particular position of the now-line shown in FIG. 3, the video and audio 1 tracks come from one source file on the hybrid recorder ("file 007") and the remaining three audio tracks come from a different file ("file 004"). It is further possible that simultaneously replayed clips from the same source file such as the "video" and "audio 1" tracks at the current position of the now-line on FIG. 3 actually represent different portions of those source files. In other words, although the two clips from file 007 appeared to be nominally aligned at their temporal start and end points, this just means that the lengths of the two clips are the same. It does not necessarily mean that the in-point time code and the out-point time code for the two clips are identical, only that the difference (in time) between the in-point and out-point are the same. This matter is referred to as "synchronization" between the clips. A loss of synchronization can have a dramatic effect on the output edited sequence—for example, with speech on an audio track not being properly synchronized with the speaker's lip movements shown on a video track. The way in which the present system deals with a loss of synchronization will be described in particular with reference to FIG. 10 below.

A master track indicator 340 indicates one of the tracks which has been selected by the user as a master track. The user can make this selection by moving the mouse cursor to the master track indicator for the desired track and operating one of the mouse buttons. One use of the master track arrangement will be described below in that any synchronisation losses are indicated to the user as differences with respect to the master track, so the master track is by definition fully synchronized.

FIG. 4 schematically illustrates a linked list of edit information data items.

The list comprises a list header 400, a series of edit information data items 410 and a list ending 420.

The linked list represents the underlying data storage of the sequence of clips for one of the tracks (horizontal rows) of the timeline. So, for the timeline shown in FIG. 3, having five tracks, there will be five parallel linked lists of edit information data items 410, each having the list header 400 and a list ending 420.

The content of an edit information data item 410 is shown schematically in FIG. 5 to include the following items:

Source Identification

Start time code (in-point)

Clip ending time code (out-point)

Transitions at each end of the clip (e.g. fades, wipes etc)

Spot erasers within the clip

A flag indicating whether the clip is live or deleted.

The source identification of the edit information data item points to a source definition file 430 containing storage details of that source material on the hybrid recorder 150 and a source title. It is of course possible for several edit information data items to point to the same source definition file 430 if multiple clips (on the same track, different tracks or a combination of these) are derived from a single source material.

The edit information data items 410 in FIG. 4 are shown as by directionally linked to adjacent items. That is to say, from any particular item the CPU 101 can readily establish which is the preceding item and which is the following item.

Figure 6:
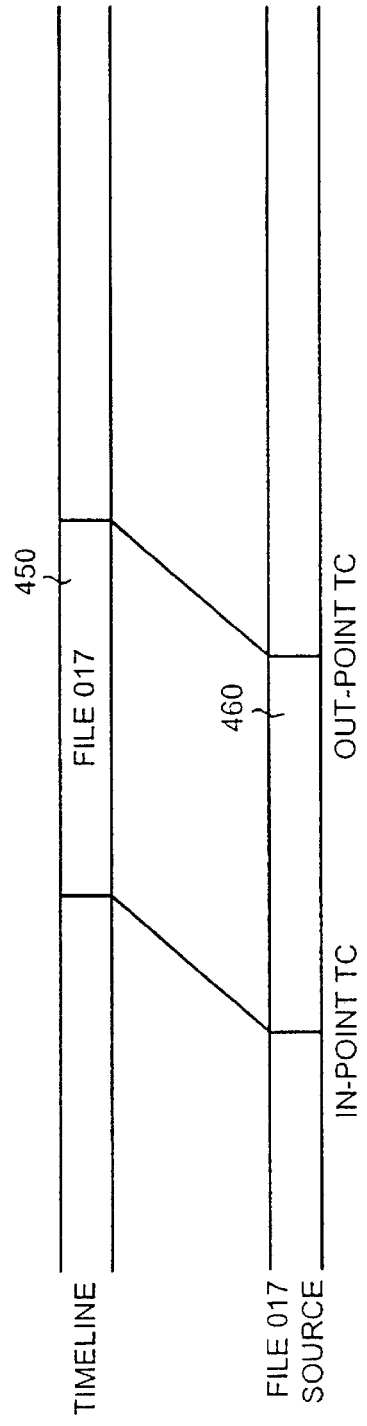
FIG. 6 schematically illustrates the relationship between a timeline clip and a source clip.

FIG. 6 schematically illustrates the relationship between a clip on the timeline and a corresponding portion of source material.

For clarity, in FIG. 6 only one track of the timeline 118 has been shown in a very schematic form, and all clips except one have been omitted. The one clip which is shown, a clip 450, is displayed on the timeline at a horizontal position representing the display time of that clip with respect to the start of the output edit material. Using the mapping of edit information data items 410 to source definition files 430, the clip is mapped to a corresponding portion 460 of the actual source material having an in-point time code and an out-point time code defining each end of that portion.

Several types of editing operation are possible on the clip shown in FIG. 6. Examples of these are: "trim in-point, trim out-point, slide in-point, slide out-point, slip source and slip recorder". Each of these will be described below.

Figure 7:
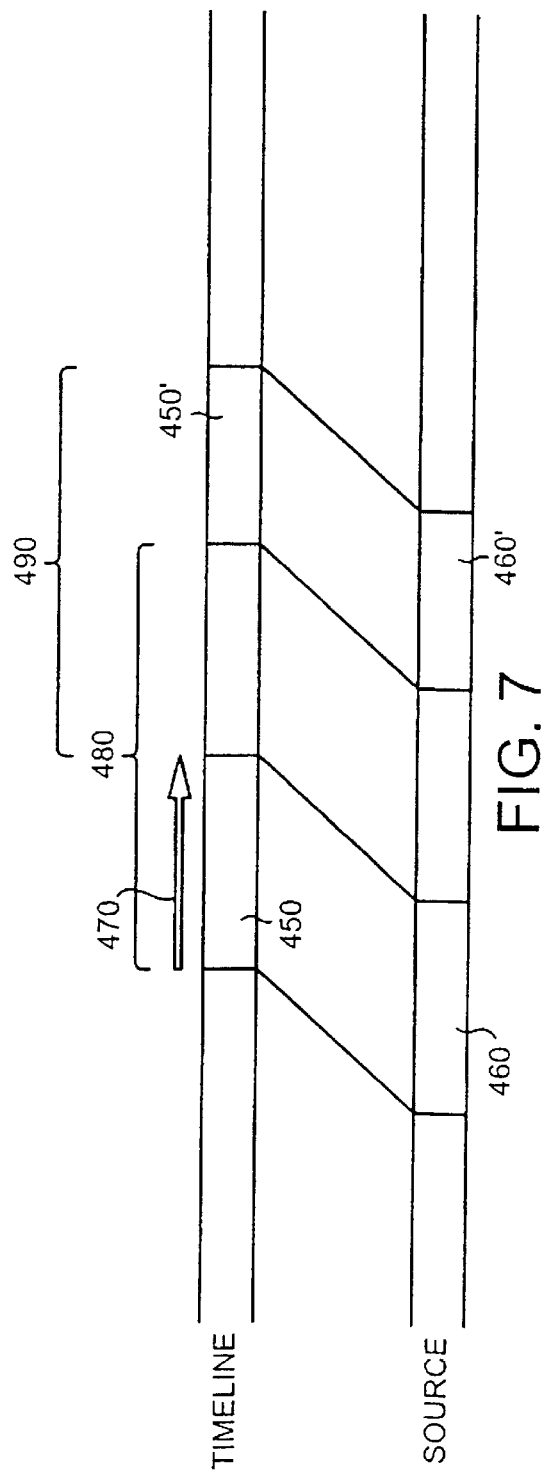
FIG. 7 schematically illustrates a slide or trim operation.

FIG. 7 schematically illustrates a slide or trim operation. In a slide or trim operation, either or both of the start and end points of the clip on the timeline are adjusted and corresponding adjustments take place to the in-point time code and the out-point time code of the corresponding portion of the source material.

In the example shown in FIG. 7, both the start and end points on the timeline are moved together by a displacement 470 to the right. So, the clip 450 moves from an initial position on the timeline 480 to a new position 490, also shown as the newly positioned clip 450'. The corresponding section of the source material is changed by altering its in-point time code and out-point time code from an initial portion 460 to a newly positioned position 460'.

Of course, if only the start point on the timeline is moved, or only the end point on the timeline is moved, or the start and end points are moved by different amounts, the length of the clip will change.

The operations described above are common to both a slide and a trim operation. The difference between sliding and trimming is that in a slide operation, any changes to the start or end points on the timeline "push" or "pull" the adjacent boundary of the preceding or following clip with them. That is to say, if the end point of a clip is changed by a slide operation to a later end point, the immediately following clip will correspondingly shrink in length by movement of its start point to a later time. After a slide operation, the sum of the lengths of the two clips surrounding the slid boundary remains the same as before; the relative lengths of those two clips might change, however.

Trim operations can be carried out (under user selection) in either a "ripple on" mode or a "ripple off" mode. In "ripple on", any changes to a clip boundary will "push" or "pull" all preceding or following clips with them.

In "ripple off" mode, if the end point of a clip is trimmed to a later position it will in effect overwrite the early part of the following clip. If the end point of a clip is trimmed to an earlier position it will leave a gap between that clip and the following clip. (Gaps are catered for in the data structure by including an edit information data item with the "live/dead" flag set to "dead").

Figure 8:
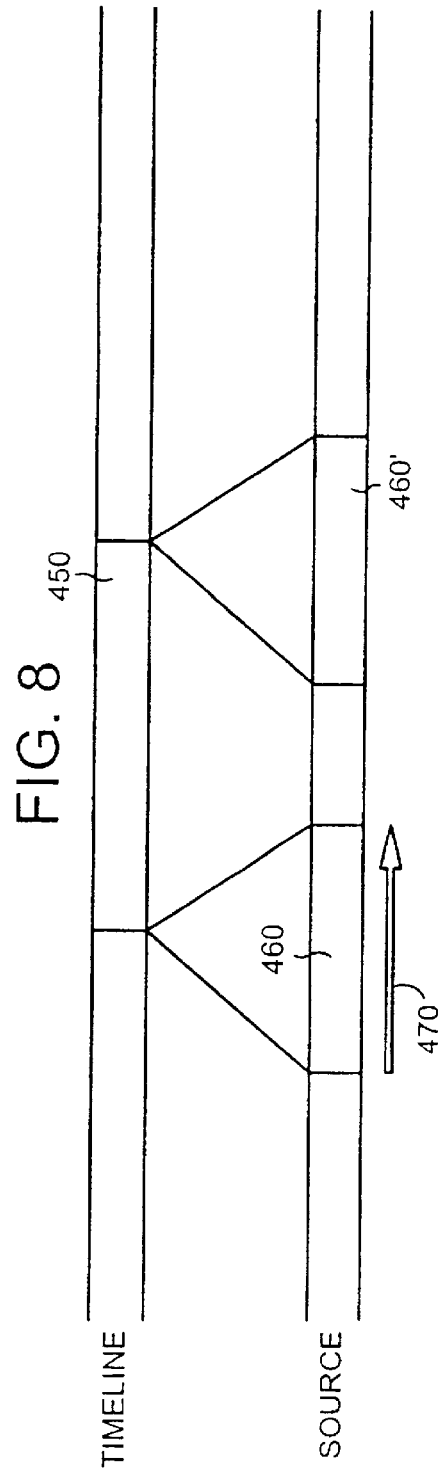
FIG. 8 schematically illustrates a slip source operation.

FIG. 8 schematically illustrates a slip source operation.

In a slip source operation, the start and end point of the clip 450 on the timeline, i.e. with respect to other surrounding clips, do not change. Also, the length of the clip 450 does not change. However, the in-point time code and the out-point time code of the corresponding source portion are altered by equal amounts to move the corresponding source portion within the source material. In the examples shown, the source portion 460 is displaced by an amount 470 to a new source portion 460'.

FIG. 9 schematically illustrates a slip recorder operation.

This is in many ways a converse of the slip source operation, in that the in-point time code and out-point time code of the source portion 460 remain unaltered but the replay position on the timeline of the clip 450 is altered, for example by an amount 470 to a new timeline position 450'.

FIG. 10 schematically illustrates an indication on the timeline of a loss of synchronisation between tracks.

The loss of synchronisation is indicated by a text notice replacing the title of the track in question. The text notice 500 gives the synchronisation displacement between the master track defined by the user (in this example, the video track shown at the top of the timeline) and the track in question as a period of time displayed as seconds and frames or SS:FF. The direction of the synchronisation displacement is also indicated by a positive or negative time difference. This particular aspect can be defined by convention, but in the present embodiment a negative time difference indicates that at the replay time indicated by the now-line 119, the time code of the master track is later than the time code of the non-synchronized track.

The manner in which the lack of synchronisation is detected will now be described.

Synchronisation is checked by a program routine carried out by the CPU 101 when any of the following events occurs.

An edit operation alters any of the tracks under the now-line.

During a replay or shuttle operation, the now-line crosses a boundary between clips on any of the tracks.

To check the synchronisation, the system first compares the source identification of the edit information data items associated with the current time position to establish whether any tracks apart from the master track come from the same source file as the master track.

If this is found to be the case, then the current (now-line) time code within each of those other tracks is compared with the current time code within the master track. If there is a difference this indicates a potential loss of synchronisation and so is flagged to the user by the indicator 500 as shown in FIG. 10.

Of course, a loss of synchronisation may be deliberate, in which case the user may ignore this indication. However, if the loss of synchronisation is accidental, for example occurring because of an earlier trim (ripple on) operation carried out on a different section of the timeline, then it is desirable to correct the loss of synchronisation.

In the present system this is done by the user taking one of two steps: if the user operates the mouse pointer and "clicks" on the synchronisation loss indicator 500, that particular track has its synchronisation restored so that it is now in synchronisation with the master track. Alternatively, if the user clicks on the master track's name (in this example, "video"), then all other tracks are synchronized to the master track.

The mechanism for correcting a synchronisation loss is to carry out a slip source operation by the exact difference of synchronisation. The slip source operation is carried out on the track which is indicated as being out of synchronisation. It is not carried out on the master track.

Of course, a slip recorder operation on the track(s) other than the master track could be used instead to correct the lack of synchronisation.

As described, a loss of synchronisation is indicated only with respect to the master track. In other embodiments, however, information can be given about other tracks as well. Consider the example where the five tracks are from the following source files:

| | | |
|---|---|---|
| video | source A | (master track) |
| audio 1 | source A | |
| audio 2 | source A | |
| audio 3 | source B | |
| audio 4 | source B | |

The way in which a loss of synchronisation can be indicated and corrected for the video, audio 1 and audio 2 tracks has already been described. There is no analytical meaning to the concept of synchronisation between source B and source A, so the same mechanism is not used to indicate a loss of synchronisation between tracks audio 3 and audio 4. However, the same detection mechanism can still be used to detect whether there is a relative discrepancy between audio 3 and audio 4. It will not be known at that stage (i.e. while video is the master track) which of audio 3 and audio 4 is the reference and which is in error, but the relative synchronisation loss can be indicated by, for example, colouring the screen display of the names of audio 3 and audio 4 in a different display colour, or by displaying a coloured marker next to the track names. If the user wishes to correct the synchronisation loss the user simply selects (maybe just temporarily) the appropriate one of those tracks as the master track and then corrects the error in the other track exactly as described earlier.

Figure 11:
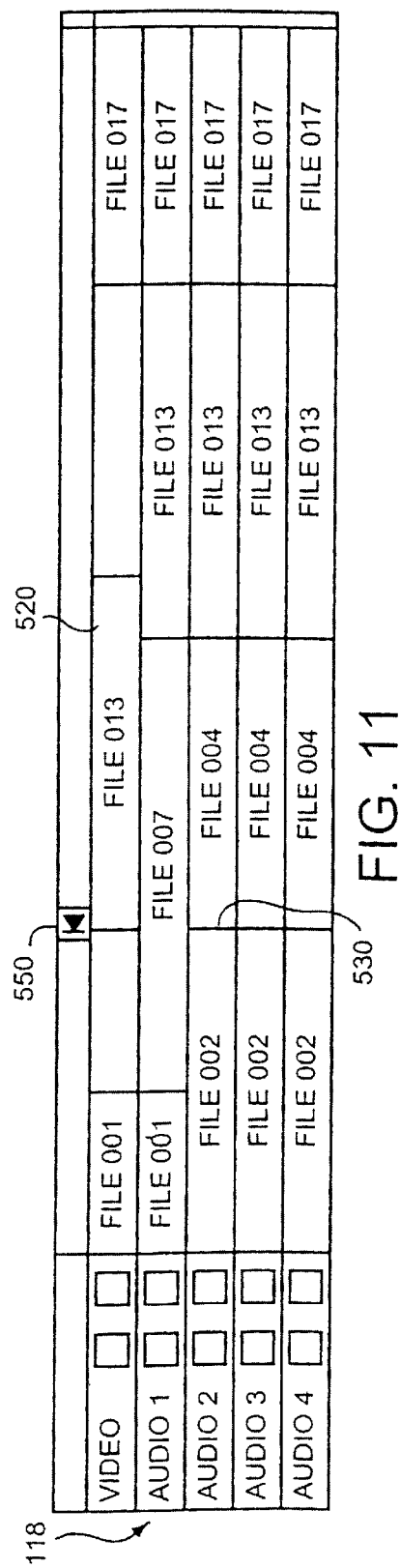
FIGS. 11 and 12 schematically illustrate nudge alignment during editing operations.
Figure 12:
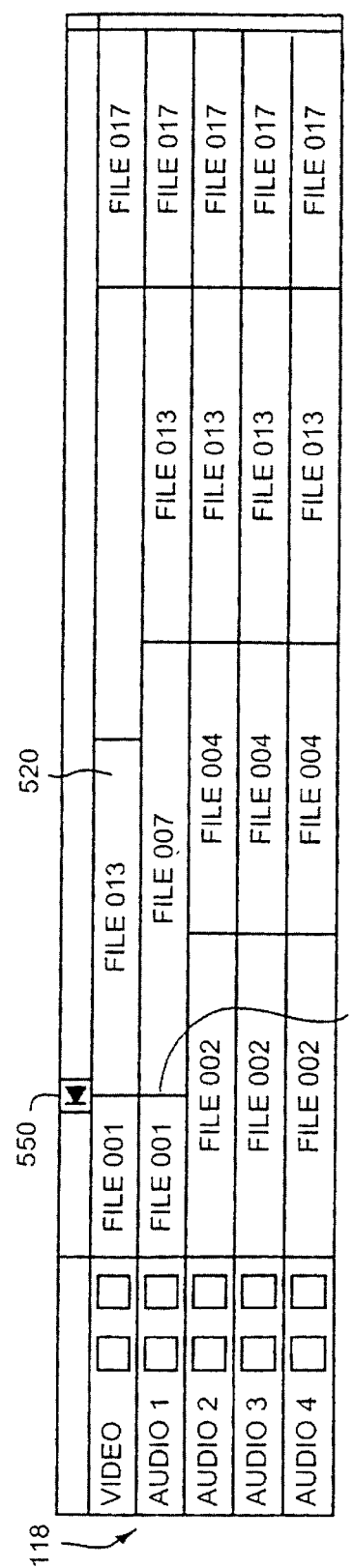

FIGS. 11 and 12 schematically illustrate nudge alignment during editing operations.

The adjustment process indicated in this example is the moving (trimming or sliding) of a clip 520 (from file 013) in a leftwards or temporally backwards direction. The nudge alignment feature described here is, however, applicable to all six of the editing operations described above with the exception of slip source operations, which of course do not change the layout of the clips on the timeline.

The user selects an adjustment mode of the five to which this feature is applicable, and selects (possibly in the same operation) a clip to which the adjustment mode is to be applied. The user can then operate one of the keys on the keyboard or one on the edit control panel, or operate a screen icon with the mouse pointer, to "nudge", or move step-wise, the selected clip.

The step-wise movement takes the clip from alignment with the start of one clip to the next in the chosen direction. So, in FIGS. 11 and 12, a first step-wise movement has taken the clip 520 from its original position (see FIG. 10 for this) to alignment with the start point 530 of the next clip in a leftwards direction. Further nudge adjustment is shown in FIG. 12, where the clip 520 is now aligned with the start point 540 of the next clip to the left.

It will be seen that the alignment points used are across the whole set of tracks, including the track of the clip being adjusted (and, indeed, including its own "original" position in that track). Further alignment points in addition to or instead of the start point of clips can be used, for example one or more categories of points selected from the following list:

Alignment with the now-line

Alignment with record marks

Alignment of the adjusted clip's timecode with the timecode of other clips

Alignment with pre-defined markers of points of interest in that or other clips

Alignment with user-defined bookmarks or positions along the timeline

Alignment with preset timing intervals on the timeline

Alignment with out (end) points of that or other clips

"Shot" markers provided in metadata accompanying the recorded material, possibly inserted by a cameraman or recordist during material acquisition.

Record markers placed by the user into the timeline to indicate the required start and end points of a clip to be inserted.

The list accordingly includes points defined by a user of the editing apparatus and points defined by a user of a different material-handling apparatus such as a camera or recorder. The list includes points related to other clips or related to the timeline.

As mentioned above, although the example illustrates the moving of a whole clip without altering its length, the technique is applicable to editing operations which move only one end of the clip, or move both ends by different amounts.

Figures 13A, 13B:
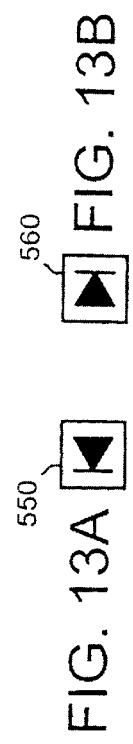
FIGS. 13a and 13b schematically illustrate screen icons.

When the clip being adjusted is aligned with the start of another clip, a screen icon 550 is displayed above the point of alignment. FIGS. 13a and 13b show two possible screen icons, one 550 for indicating alignment between the current point of interest of the clip being adjusted (i.e. the start point in this example) and the start point of another clip, and another icon 560 for indicating alignment between the current point of interest of the clip being adjusted and the end point of another clip. In general, a different type of icon can be used for indicating alignment with each category of point in the list above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Editing apparatus for editing recorded audio and/or video material arranged as one or more parallel sequences of temporally successive clips, said clips being represented by representative clip displays on a display screen, at least some of said clips having one or more predefined temporal points displayed as start points and end points within said representative clip displays, said apparatus comprising:

user control means for enabling a user to repeatedly move in a stepwise manner a start point, end point or both the start point and the end point of a desired clip display, said user control means being operable to adjust said temporal point in steps so that at each step the displayed temporal point is aligned with a predefined point of another representative clip display in the same or another parallel sequence.

2. Apparatus according to claim 1, in which a predefined point for each of said clips is a start point of that clip.

3. Apparatus according to claim 1, in which a predefined point for each of said clips is an end point of that clip.

4. Apparatus according to claim 1, comprising a second user control means to predefine points as points of interest within said clips.

5. Apparatus according to claim 1, in which at each step said temporal point is aligned with a temporally next predefined point in a current direction of adjustment.

6. Apparatus according to claim 1, in which temporal alignment at each step is indicated by a screen display item.

7. Apparatus according to claim 1, in which at each step said temporal point is aligned with a point in that or another clip defined by metadata accompanying said clip.

8. Apparatus according to claim 1, comprising a linked list store, storing a linked list of data items associated with respective ones of said clips each data item defining a source file and, relative to said timecode associated with that source file, an in-point timecode and an out-point timecode.

9. Editing method for editing recorded audio and/or video material arranged as one or more parallel sequences of temporally successive clips, said clips being represented by representative clip displays on a display screen, at least some of said clips having one or more predefined temporal points displayed as start points and end points within said representative clip displays, said method comprising the step of:

enabling a user to repeatedly move in a stepwise manner a start point, end point or both the start point and the end point of a desired clip display, so to adjust said temporal point in steps so that at each step the displayed temporal point is aligned with a predefined point of another representative clip display in the same or another parallel sequence.

10. A computer program for controlling editing of recorded audio and/or video material arranged as one or more parallel sequences of temporally successive clips, said clips being represented by representative clip displays on a display screen, at least some of said clips having one or more predefined temporal points displayed as start points and end points within said representative clip displays, the program comprising instructions for:

providing for user adjustment to repeatedly move in a stepwise manner a start point, end point or both the start point and the end point of a desired clip display, so to adjust said temporal point in steps so that at each step the displayed temporal point is aligned with a predefined point of another representative clip display in the same or another parallel sequence.

11. A providing medium having recorded thereon a computer program for controlling editing of recorded audio and/or video material arranged as one or more parallel sequences of temporally successive clips, said clips being represented by representative clip displays on a display screen, at least some of said clips having one or more predefined temporal points displayed as start points and end points within said representative clip displays, the medium having recorded thereon program instructions for:

providing for user adjustment to repeatedly move in a stepwise manner a start point, end point or both the start point and the end point of a desired clip display, so to adjust said temporal point in step so that at each step the displayed temporal point is aligned with a predefined point of another representative clip display in the same or another parallel sequence.

* * * * *